(12) United States Patent
Soliman et al.

(10) Patent No.: US 8,249,005 B2
(45) Date of Patent: Aug. 21, 2012

(54) SYSTEMS AND METHODS FOR REDUCING POWER CONSUMPTION USING A VARIABLE CONSTRAINT LENGTH CONVOLUTIONAL ENCODER

(75) Inventors: Samir Soliman, San Diego, CA (US); Ozgur Dural, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 539 days.

(21) Appl. No.: 12/436,351

(22) Filed: May 6, 2009

(65) Prior Publication Data
US 2010/0202334 A1    Aug. 12, 2010

Related U.S. Application Data

(60) Provisional application No. 61/151,799, filed on Feb. 11, 2009.

(51) Int. Cl.
*H04W 4/00* (2009.01)
*G06F 11/10* (2006.01)
(52) U.S. Cl. .......................................... 370/329; 714/52
(58) Field of Classification Search ................... 370/328, 370/329; 714/52
See application file for complete search history.

(56) References Cited

U.S. PATENT DOCUMENTS

| | | | |
|---|---|---|---|
| 4,495,619 A | 1/1985 | Acampora | |
| 6,272,123 B1 * | 8/2001 | Abe | 370/342 |
| 6,549,542 B1 * | 4/2003 | Dong et al. | 370/441 |
| 6,690,750 B1 | 2/2004 | Hocevar et al. | |
| 2002/0167998 A1 * | 11/2002 | Penther | 375/229 |
| 2003/0054848 A1 * | 3/2003 | Kenney et al. | 455/522 |
| 2009/0080403 A1 * | 3/2009 | Hamdi | 370/345 |
| 2010/0074233 A1 * | 3/2010 | Yi et al. | 370/336 |

FOREIGN PATENT DOCUMENTS

EP    1199815 A1    4/2002

OTHER PUBLICATIONS

International Search Report and Written Opinion—PCT/US2010/023959, International Search Authority—European Patent Office—Jul. 2, 2010.

* cited by examiner

*Primary Examiner* — Ronald Abelson

(74) *Attorney, Agent, or Firm* — Qualcomm Patent Group; Jeffrey Jacobs; James H. Yancey, Jr.

(57) ABSTRACT

Systems and methods are provided for selecting transmission parameters used in the transmission of a communication signal in a wireless communications device. In one embodiment, a computer-implemented method for determining a convolutional code constraint length and/or a modulation type is provided. The method includes obtaining a channel condition for a channel associated with transmission of the communication signal. Based at least in part on the channel condition, the method includes selecting a convolutional code constraint length and/or a modulation type for transmitting the communications signal. In some embodiments, the method also includes selecting a data rate for transmitting the communications signal.

53 Claims, 9 Drawing Sheets

SYSTEMS AND METHODS FOR REDUCING POWER CONSUMPTION USING A VARIABLE CONSTRAINT LENGTH CONVOLUTIONAL ENCODER

RELATED APPLICATIONS

The present Application for Patent claims priority to U.S. Provisional Application No. 61/151,799 filed Feb. 11, 2009, which is hereby expressly incorporated by reference in its entirety.

BACKGROUND

1. Field

The present application relates to wireless communication technology and, more particularly, to systems and methods for using variable constraint length encoders.

2. Background

Wireless communication systems are widely deployed to provide various types of communication including voice, multimedia, video, audio, data, and so forth. In some wireless systems, orthogonal frequency-division multiplexing (OFDM) is implemented, which advantageously provides improved transmission in the presence of severe channel conditions, resilience to radio frequency (RF) interference, and lower multi-path distortion. In OFDM, each subcarrier is selected to be orthogonal to each of the other subcarriers. Orthogonality beneficially avoids adjacent subchannel interference and allows efficient modulator and demodulator implementation using fast Fourier transforms (FFTs). The data to be transmitted (e.g., the information bits) are encoded with a particular coding scheme to generate coded bits (e.g., via a convolutional encoder), and the coded bits may further be grouped into multi-bit symbols that are then mapped to modulation symbols based on a particular modulation scheme (e.g., quadrature amplitude modulation or phase shift keying). At each time interval that may be dependent on the bandwidth of each frequency subchannel, a modulation symbol may be wirelessly transmitted on each of the frequency subchannels to a receiver. At the receiver, the received modulated symbols are demodulated and decoded (e.g., via a convolutional decoder).

Communication protocols capable of providing high data transfer rates are becoming available. Ultra-wideband (UWB) technologies are emerging that provide large bandwidth able to deliver high data rates over short distances. For example, the ECMA-368 "High Rate Ultra Wideband PHY and MAC Standard" incorporates a physical (PHY) layer radio based on multi-band OFDM and a media access control (MAC) layer that enables high speed, low power consumption data transfers in the 3.1 GHz to 10.6 GHz RF band in a wireless personal area network (WPAN). Data transfer rates up to 480 megabits per second (Mbps) are provided by the ECMA-368 Standard.

There is increasing demand for efficient, low power consumption, high data rate wireless transfers of voice and multimedia data. However, increasing data rates often result in increases in power consumption, which is especially problematic for battery powered devices, such as wireless handsets.

SUMMARY

Embodiments of systems and methods are provided for selecting transmission parameters used in the transmission of a communication signal in a wireless communications device. In some implementations, the transmission parameters can include a constraint length for convolutionally encoding the communication signal, a modulation type for modulating the signal, and/or a data rate for transmitting the signal.

In one embodiment, a method for determining a convolutional code constraint length for use in transmitting a communication signal during a data session with a first radio is provided. The method includes obtaining a channel condition for a channel associated with transmission of the communication signal during the data session with the first radio. Based at least in part on the channel condition, the method includes dynamically selecting, from a plurality of convolutional code constraint lengths, a convolutional code constraint length to be used for encoding the communication signal. The dynamical selection of the convolutional constraint length can be performed via execution of instructions by a computing device.

An embodiment of a computer program product includes a computer-readable medium comprising code operable to cause a computer to obtain a channel condition for a channel associated with transmission of a communication signal during a data session with a first radio. The computer-readable medium can also comprise code operable to cause a computer to, based at least in part on the channel condition, dynamically select, from a plurality of convolutional code constraint lengths, a convolutional code constraint length to be used for encoding the communication signal.

An embodiment of a wireless communication apparatus comprises a transmitting device configured to transmit a communication signal during a data session with a first radio. The transmitting device comprises a circuit configured to determine a convolutional code constraint length for use in transmitting the communication signal. The circuit can be configured to obtain a channel condition for a channel associated with transmission of the communication signal during the data session with the first radio. The circuit can be further configured to dynamically select, from a plurality of convolutional code constraint lengths, a convolutional code constraint length to be used for encoding the communication signal. The dynamical selection can be based at least in part on the channel condition.

An embodiment of an apparatus for determining a convolutional code constraint length for use in transmitting a communication signal during a data session with a first radio is provided. The apparatus comprises means for obtaining a channel condition for a channel associated with transmission of the communication signal during the data session with the first radio. The apparatus further comprises means for dynamically selecting, from a plurality of convolutional code constraint lengths, a convolutional code constraint length to be used for encoding the communication signal. The means for dynamically selecting can be configured to perform the selection based at least in part on the channel condition.

An embodiment of a processing apparatus for a wireless network configured to transmit a communication signal during a data session with a first radio is provided. The processing apparatus comprises a memory for storing a channel condition for a channel associated with transmission of the communication signal and a plurality of convolutional code constraint lengths. The processing apparatus further comprises a processor configured to dynamically select, from the plurality of convolutional code constraint lengths a convolutional code constraint length for encoding the communication signal. The processor can be configured to perform the dynamical selection based at least in part on the channel condition.

An embodiment of a method for decoding a communication signal received during a data session with a first radio is provided. The communication signal can be encoded with a convolutional code constraint length selected from a plurality of convolutional code constraint lengths. The method comprises dynamically determining, during the data session with the first radio, the convolutional code constraint length used to encode the communication signal. The method further comprises decoding the communication signal based at least in part on the dynamically determined convolutional code constraint length. The dynamical determination and the decoding can be performed via execution of instructions by a computing device.

An embodiment of a computer program product can comprise a computer-readable medium that comprises code operable to dynamically determine a convolutional code constraint length used to encode a communication signal communicated during a data session with a first radio. The computer-readable medium can further comprise code operable to decode the communication signal based at least in part on the dynamically determined convolutional code constraint length.

An embodiment of a wireless communication apparatus comprises a receiving device configured to receive a communication signal during a data session with a first radio. The communication signal can be encoded with a convolutional code constraint length selected from a plurality of convolutional code constraint lengths. The receiving device can comprise a circuit configured to dynamically determine a convolutional code constraint length used to encode the communication signal communicated during the data session with the first radio. The circuit can be further configured to decode the communication signal based at least in part on the dynamically determined convolutional code constraint length.

An embodiment of an apparatus for decoding a communication signal received during a data session with a first radio is provided. The communication signal can be encoded with a convolutional code constraint length selected from a plurality of convolutional code constraint lengths. The apparatus comprises means for dynamically determining the convolutional code constraint length used to encode the communication signal communicated during the data session with the first radio. The apparatus further comprises means for decoding the communication signal based at least in part on the dynamically determined convolutional code constraint length.

An embodiment of a processing apparatus for a wireless network operable to communicate a communication signal during a data session with a first radio is provided. The communication signal can be encoded with a convolutional code constraint length selected from a plurality of convolutional code constraint lengths. The processing apparatus comprises a processor configured to dynamically determine the convolutional code constraint length used to encode the communication signal during the data session with the first radio and to decode the communication signal based at least in part on the dynamically determined convolutional code constraint length.

BRIEF DESCRIPTION OF THE DRAWINGS

FIG. 4 presents example simulation results for communication at 480 Mbps with data convolutionally encoded with constraint length K=3, 4, 5, 6, and 7.

DETAILED DESCRIPTION

Figure 1:
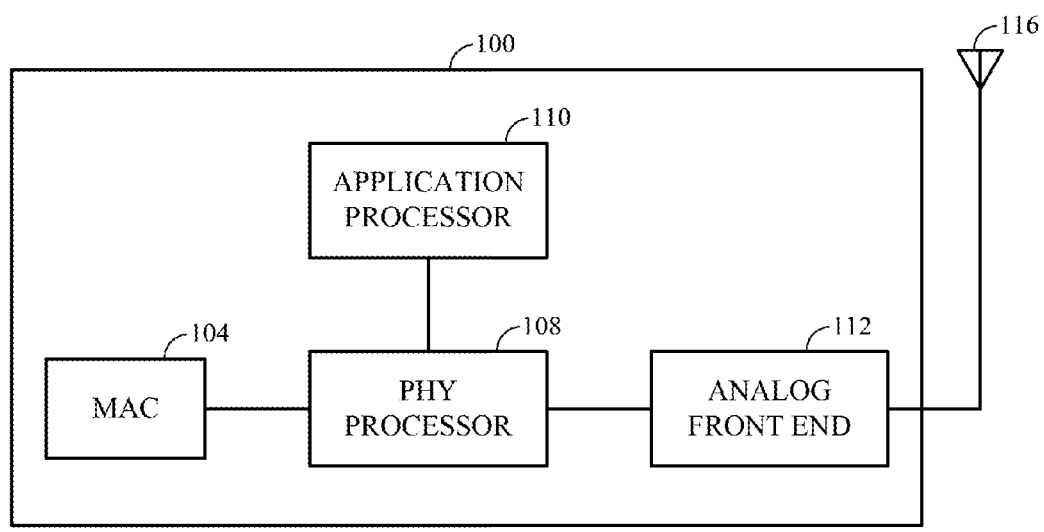
FIG. 1 is a schematic block diagram illustrating an example wireless communications device.

The following detailed description is directed to certain specific embodiments intended to illustrate the teachings herein. Accordingly, the teachings herein are not intended to be limited by the specific embodiment but can be embodied in a multitude of different ways. In this description, reference is made to the drawings wherein like parts are designated with like numerals throughout.

In high data rate communication systems, the convolutional decoder in the receiver conventionally runs at a very high speed to decode transmitted signals. Hence, the convolutional decoder typically consumes a significant amount of power. Encoders in the transmitter are conventionally designed for worst case channel conditions. For example, parameters of an error-correcting encoding algorithm (e.g., constraint length of the convolutional code) may be selected to permit reliable data transfer by allowing the decoder to detect and correct errors (within a suitable error bound) even under worst case conditions. However, in many or most cases the channel conditions are much better than the worst case conditions. Therefore, if the encoder is configured to select encoding parameters (e.g., a smaller constraint length) based on one or more channel conditions, power consumption by the decoder advantageously can be reduced due to the reduced processing burden on the decoder.

Power consumption by the receiver can be reduced by suitably selecting other transmitter parameters based on one or more channel conditions. For example, based on current channel conditions, the modulation scheme used (e.g., QPSK or DCM), the data rate, and so forth can be adjusted (additionally or alternatively to encoding parameters) to provide reduced power consumption.

As will be described in more detail herein, both analytical and numerical simulation results demonstrate that power consumed by the convolutional decoder is a generally monotonic function of the constraint length of the convolutional code used by the encoder. While, as discussed above, conventional communication systems are often designed for worst case channel conditions, certain embodiments described herein are designed to dynamically switch to, e.g., a smaller constraint length, a different modulation scheme, and/or a different data rate where there is additional link margin (e.g., based on a measurement of the channel conditions) to reduce power consumption (e.g., in a high data rate environment). In some embodiments, the data rate (and/or the modulation scheme) is kept constant, even though the constraint length is varied.

The embodiments described herein may be implemented in any device that is configured to communicate over channels with time varying characteristics (e.g., where the signal to noise ratio changes). By way of example, and not limitation, embodiments disclosed herein can be used in mobile or non-mobile devices and/or in communication with mobile or non-mobile devices configured to receive and/or transmit communication signals. Non-limiting examples of such devices include cellular phones, mobile devices, WiFi devices, desktop computers, laptop computers, audio and/or video players, video game players, consoles, or controllers, GPS receivers/navigators, television sets, automobiles, wireless headsets, wireless microphones, wireless speakers, wireless remote control devices, wireless pointing devices (e.g., mice, trackballs, touch pads, etc.), etc. The devices can communicate using any wireless network including, but not limited to, short, medium, and/or long range wireless networks. For example, embodiments disclosed herein can be used to communicate using networks such as, e.g., WAN, LAN and/or PAN. Optionally, one or more of the following protocols may be used: ECMA-368, WiFi (e.g., IEEE 802.11a/b/g WLAN), ZigBee, Bluetooth, UWB, WiMAX, GSM, UTMS, TDMA, FDMA, CDMA, etc. Embodiments described herein can be utilized in still other devices using other communication protocols and/or communication protocols under development (e.g., 3GPP or 3GPP2).

FIG. 1 is a schematic block diagram illustrating an embodiment of a wireless communications device 100 that comprises MAC circuitry 104, a PHY processor 108, an application processor 110, an analog front end (AFE) 112, and an RF antenna 120. In various embodiments, the device 100 can be configured as a transmitter, a receiver, or as a transceiver to both transmit and receive signals. For example, to transmit data, the MAC circuitry 104 may supply digital information to the PHY processor 108 for transmission by the device 100. The MAC circuitry 104 optionally may be configured to be compliant with a suitable wireless communications standard such as, for example, the ECMA-368 UWB standard. In some embodiments, the MAC layer and a PHY radio layer may be implemented using shared electrical components. The PHY radio layer and the MAC layer may be compliant with a PHY-MAC signal interface standard such as, e.g., the ECMA-369 standard. The application processor 110 can be used for executing application operating system and/or separate applications.

To transmit data, the PHY processor 108 accepts and processes digital information from the MAC circuitry 104 and supplies a baseband signal to the AFE 112. The baseband signal may comprise a plurality of multiplexed subcarrier frequencies. The AFE 112 may upconvert the baseband signal to RF frequencies for transmission on the antenna 116. To receive data, the antenna 116 receives an RF signal and downconverts it to a baseband signal (which may comprise multiplexed subcarriers). The PHY processor 108 accepts the baseband signal for processing and delivery of a recovered estimate of the transmitted signal to the MAC circuitry 104. In some embodiments, the receiver can be implemented as a rake receiver.

In certain embodiments, a transmitting device can communicate a communication signal to a receiving device during a data session with a radio. In some implementations, the transmitting device and the receiving device use a single radio during the data session to communicate the communication signal. The radio can include PHY and/or MAC circuitry (e.g., the PHY processor 108 and/or the MAC circuitry 104 in various examples) and optionally can be operable with an ultra wideband standard such as, e.g., ECMA-368. Additionally and/or optionally, the radio can comprise PHY and MAC circuitry operable with a wireless network such as, e.g., wireless WAN (WWAN), wireless LAN (WLAN), and/or wireless PAN (WPAN). The radio may be operable with other wireless networks and/or wireless standards in other embodiments. As will be further described herein, in certain such embodiments the communication signal can be encoded by the transmitting device using a variable constraint length convolutional encoder. The receiving device can be configured to decode the communication signal encoded with the variable constraint length encoder.

Figure 2:
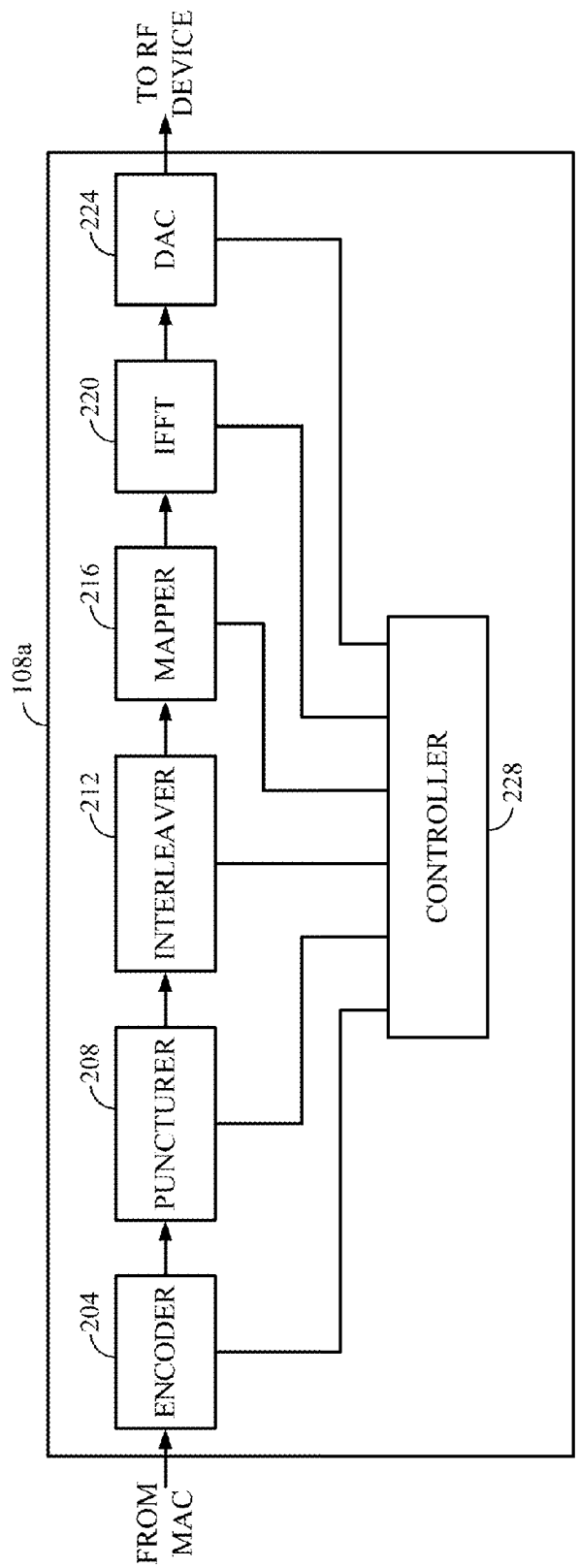
FIG. 2 is a schematic block diagram illustrating an embodiment of a PHY processor that can be used for transmitting data.

FIG. 2 is a schematic block diagram illustrating an embodiment of a PHY processor 108a that can be used for transmitting data. Digital information from the MAC is accepted by an encoder 204 that uses one or more coding schemes to provide coded bits. The coding scheme may provide forward error correction (FEC) to improve reliability of the data transmission by allowing the receiver to detect and correct errors.

In certain embodiments, the encoder 204 comprises a convolutional encoder that uses one or more convolutional codes to encode the data. In a convolutional code, an m-bit input symbol (e.g., an m-bit string) is transformed into an n-bit output symbol (e.g., an n-bit string) using a plurality of generator polynomials that are selected to provide good error correction properties. The quantity m/n is called the code rate, R. As an example, the ECMA-368 standard provides that R=⅓ is used as the basic, "mother" rate. Other code rates can be used by the encoder 204 such as, e.g., R=½, ⅔, ¾, ⅚, ⅝, etc. As discussed below, puncturing can be used to generate higher code rates from a mother code rate.

A convolutional code is also specified by a constraint length K, which represents the number of bits in the encoder that affect the generation of the n output bits in one encoder cycle. For example, the ECMA-368 standard specifies a constraint length of K=7. Embodiments of the encoder 204 can use one or more of any suitable constraint lengths including, e.g., K=3, 4, 5, 6, 7, 8, 9, or more. As will be further discussed herein, certain embodiments of the encoder 208 advantageously utilize a variable constraint length convolutional code, which in certain such embodiments, can be dynamically selected based on channel conditions. The encoder 204 may be configured to be capable of encoding data using a constraint length selected from a plurality of constraint lengths. For example, the encoder 204 may be able to select a constraint length from a range of K (e.g., K from 3 to 7) or from a set of particular values of K (e.g., K=3, 5, 8). In some implementations, a particular constraint length is selected based on one or more system parameters such as, e.g., signal quality of a subchannel, power or energy consumption of the decoder, and so forth.

A puncturer 208 optionally may be used in some embodiments of the processor 108b to provide code rates in addition to the mother code rate. For example, the puncturer 208 may omit some of the coded bits received from the encoder 204, thereby reducing the number of bits to be transmitted and thereby increasing the code rate.

An interleaver 212 interleaves the coded bits received from the puncturer 208 based on an interleaving scheme to provide time and/or frequency diversity and to protect against localized corruption or burst errors. The interleaving scheme can be selected to match the error correcting capabilities of the convolutional code used by the encoder 204.

A symbol mapper 216 receives the interleaved bits and generates modulated symbols for the frequency subchannels based on one or more modulation schemes. For each modulation scheme selected for use, the modulation may be achieved by grouping sets of received bits to form multi-bit symbols and mapping each multi-bit symbol to a point in a signal constellation corresponding to the selected modulation scheme. Each mapped signal point corresponds to a modulation symbol. The symbol mapper 216 provides a vector of modulation symbols for each transmission symbol period, with the number of modulation symbols in each vector corresponding to the number of frequency subchannels selected for use for that transmission symbol period.

The symbol mapper 216 may be configured to use one or more suitable modulation schemes including, but not limited to, implementations of binary or quadrature phase shift keying (BPSK or QPSK), differential phase shift keying (DPSK), quadrature amplitude modulation (QAM), dual carrier modulation (DCM), and so forth. For example, the ECMA-368 standard provides that for data rates of 200 Mbps and lower, binary data should be mapped onto a QPSK constellation and for data rates of 320 Mbps and higher, binary data should be mapped onto a multi-dimensional constellation using DCM.

An inverse FFT (IFFT) 220 accepts the modulation symbol vector generated by the mapper 216 and converts the symbol vector to the time domain (e.g., as an OFDM symbol) for conversion to analog by digital-to-analog converter (DAC) 224 and then transmission by the RF device.

In some embodiments of the PHY processor 108b, the symbol mapper 216 also receives pilot data, which can comprise data of a known pattern that is processed in a known manner, if at all. The pilot data can be multiplexed with the coded signal data and transmitted by the device 100 to a receiver. The receiver can use the pilot data for a variety of functions including, e.g., channel estimation, acquisition, frequency and timing synchronization, coherent data demodulation, and so forth.

The PHY processor 108b also comprises a controller 228 that is operably connected to one or more of the encoder 204, the puncturer 208, the interleaver 212, and the mapper 216. In various embodiments, the controller 228 can be implemented with a microprocessor, application specific integrated circuit (ASIC), or other processing device or circuit. The controller 228 may include or may be communicatively coupled to a data storage device such as, e.g., RAM, ROM, EEPROM, etc. In certain embodiments, the controller 228 determines, for example, the data transfer rate, the coding scheme(s) (e.g., constraint length of the convolutional code(s)), and/or the modulation scheme(s) used by the PHY processor 108b. In certain such embodiments, the controller 228 makes such determinations based at least in part on information received from a receiver (e.g., estimates of channel quality).

Figure 3:
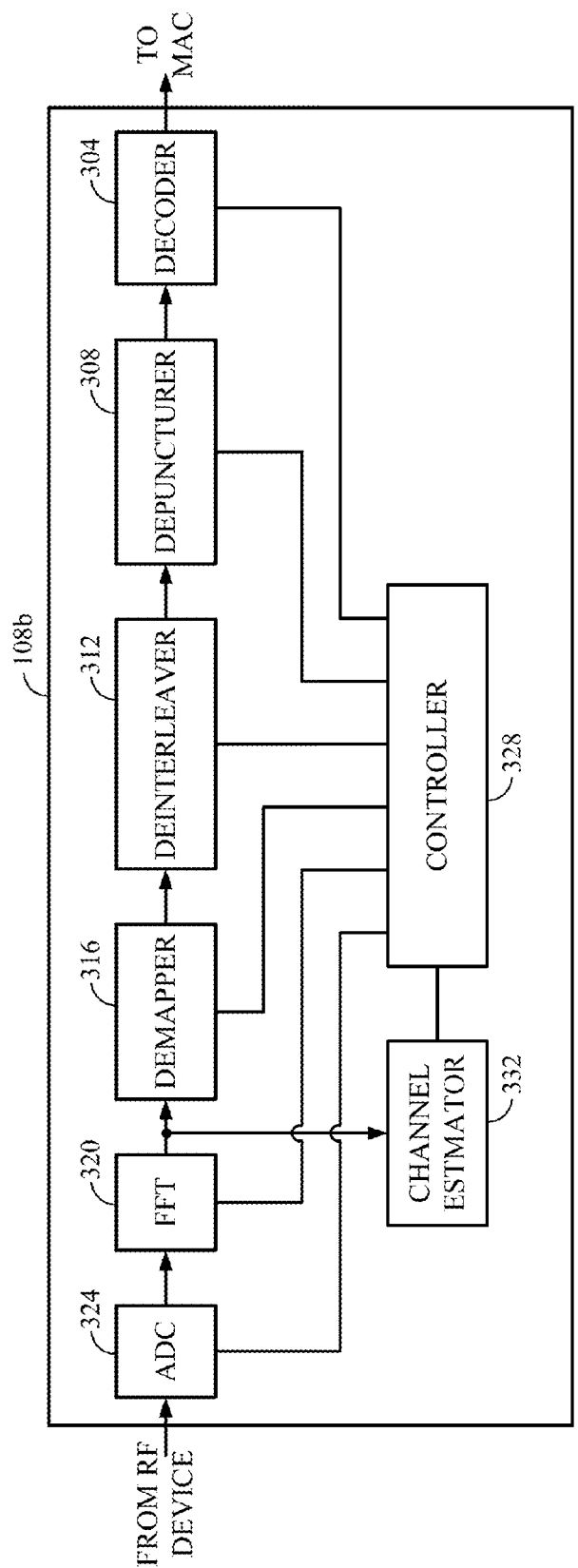
FIG. 3 is a schematic block diagram illustrating an embodiment of a PHY processor that can be used for receiving data.

FIG. 3 is a schematic block diagram illustrating an embodiment of a PHY processor 108b that can be used for receiving data. The transmitted, modulated RF symbols are received and downconverted to a baseband signal, which is digitized by an analog-to-digital converter (ADC) 324, and transformed to the frequency domain by an FFT 320. The FFT 320 provides a vector of $N_F$ modulation symbols for the $N_F$ frequency subchannels used for data transmission for each transmission symbol period. A demapper 316 demodulates the symbols according to one or more demodulation schemes that are complementary to the one or modulator schemes used at the transmitter. The demodulated symbols are deinterleaved and depunctured by delinterleaver 312 and depuncturer 308, respectively, using schemes complementary to those used by the interleaver 212 and puncturer 208, respectively. A decoder 304 is used to decode the encoded data to provide an estimate of the transmitted source data bits. In some embodiments, the decoder 304 implements a maximum likelihood decoding algorithm such as, e.g., a Viterbi algorithm, to decode bits encoded using a convolutional code. In other embodiments, the decoder 304 may use other decoding algorithms such as, e.g., a sequential decoding algorithm such as, e.g., a Fano algorithm.

The illustrated embodiment of the PHY processor 108b also comprises a channel estimator 332, which estimates one or more channel conditions for the one or more subchannels in the communications system. In some implementations, the channel estimator 332 determines a channel condition based at least in part on received samples for pilot data transmitted from the transmitter. Channel conditions can include, but are not limited to, some or all of the following: a signal-to-noise ratio (SNR), quality-of-service (QoS), an interference indicator, a received signal strength indicator (RSSI), an energy per bit to thermal noise density (Eb/No), a bit error rate (BER), a block error rate (BLER), a packet error rate (PER), a link quality indicator (LQI), a frequency response, a noise variance, an acknowledgment (ACK), a negative acknowledgement (NACK), and so forth.

The PHY processor 108b may also comprise a controller 328 that is operably connected to one or more of the decoder 304, the depuncturer 308, the deinterleaver 312, the demapper 316, and the channel estimator 332. In various embodiments, the controller 328 can be implemented with a microprocessor, ASIC, or other processing device. The controller 328 may include or may be communicatively coupled to a data storage device such as, e.g., RAM, ROM, EEPROM, etc. In some embodiments, the controller 328 receives information from the channel estimator 332 (e.g., one or more channel conditions) for transmission to the transmitting device, which can use the channel conditions to provide increased efficiency of the communications system. For example, as will be further discussed herein, in certain embodiments, the transmitting device can select a constraint length of a convolutional code, a data rate, and/or a modulation scheme based at least in part on one or more channel conditions. In certain embodiments, the transmitting device can select constraint length, data rate, and/or modulation scheme so as to reduce power and/or energy consumption in a receiving device, optionally in addition to other considerations.

In an illustrative embodiment, the channel conditions are used to determine one or more transmitter characteristics (e.g., a constraint length, a modulation type, and/or a data rate). For example, the channel conditions may determine the signal-to-noise ratio (SNR) based on a ratio of the outputs of a signal power estimator and a noise power estimator. The channel conditions are then used (e.g., by the controller 228 and/or the encoder 204), at least in part, to access a table (or other data organization) to identify/determine the appropriate constraint length, data rate, and/or modulation type to use in order to reduce power consumption on the receiver side, while still providing a communication signal that can be decoded given the prevailing channel conditions. By way of example, the table (or other data organization) may be stored in computer readable media (e.g., RAM, ROM, or other media). Example tables are illustrated herein. Interpolation and/or extrapolation techniques can be used to obtain estimates for values not specifically included in the table.

Optionally, in addition to or instead of a table, one or more formulas and/or algorithms can be used to select the appropriate constraint length, data rate, and/or modulation type. For example, curve fitting techniques (e.g., least squares, regression, etc.) can be used to determine a formula that provides a "best fit" to data in a table (and/or data output from a simulation program). The formula can be used to identify/determine the appropriate constraint length, data rate, and/or modulation type in some implementations of the disclosed systems and methods.

Embodiments of the systems and methods described herein can be used in addition to or instead of other techniques to reduce power in the transmitting device, the receiving device, or both devices. For example, in some embodiments, if the data rate drops below a certain threshold, the encoder can use, in addition or instead, other techniques to reduce power consumed by the receiving device. Additional non-limiting, example embodiments will now be described.

In the ECMA-368 standard, a convolutional code with a fixed constraint length K=7 is used. In general, there is a tradeoff between performance and power consumption. Embodiments described herein provide a flexible way for taking advantage of this tradeoff, particularly for higher data rates.

Figure 4:
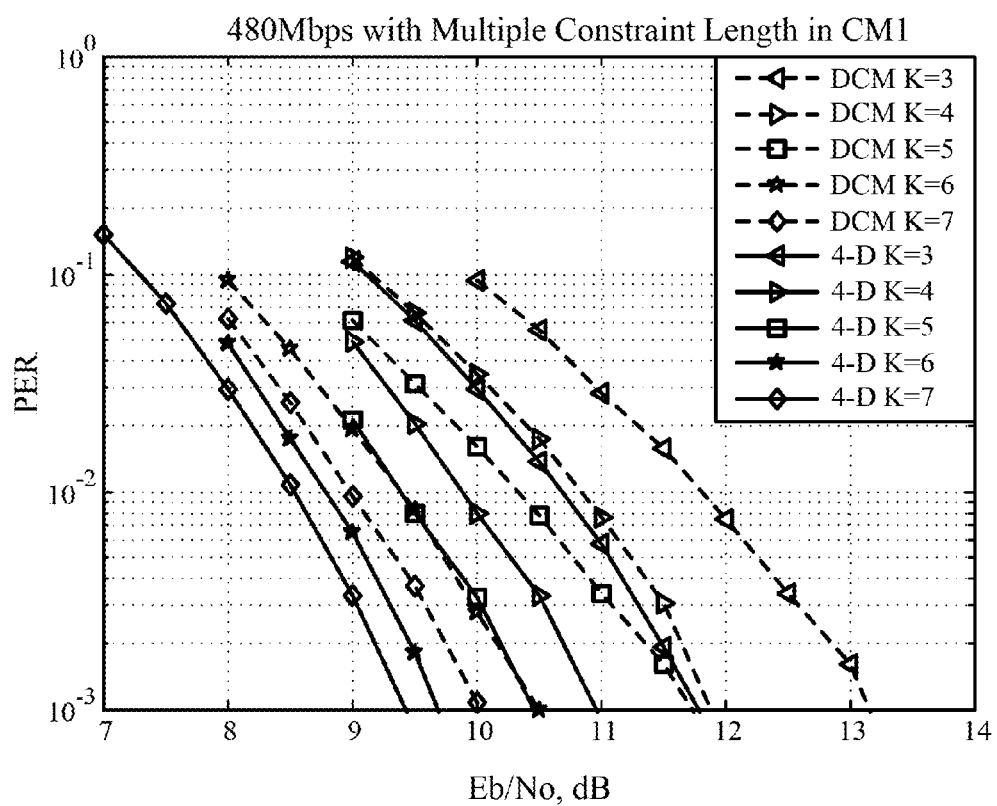
FIG. 4 is a graph of packet error rate (PER) versus energy per bit to noise power spectral density ratio (Eb/No, in dB) for two modulation schemes: DCM and 4-dimensional (4-D) orthogonal modulation.

Results from various example simulations with constraint lengths K from 3 to 7 are described herein. In the following example simulations, a rate R=½ code with optimal puncturing was used. In other implementations, other constraint lengths and/or code rates can be used. FIG. 4 is a graph of packet error rate (PER) versus energy per bit to noise power spectral density ratio (Eb/No, in dB) for two modulation schemes: DCM and 4-dimensional (4-D) orthogonal modulation. FIG. 4 presents example results for communication at 480 Mbps with data convolutionally encoded with K=3, 4, 5, 6, and 7. The example results shown in FIG. 4 show that for a given modulation scheme, PER decreases monotonically as Eb/No increases.

Table 1 provides example values of Eb/No at 1% PER for the DCM and 4-D modulation schemes for constraint lengths K=3 to 7 and for an example with no coding. Table 1 also provides example values of power (in mW) consumed by a Viterbi decoder (VD) in decoding data encoded at constraint lengths from K=3 to 7 and without encoding. The example data shown in Table 1 demonstrate that substantial reductions in Viterbi decoder power consumption are achieved as the constraint length decreases. For example, with additional 0.41 dB in the link margin with DCM, the power consumption in the Viterbi decoder decreases by 43% by switching from K=7 to K=6. As another example, with an additional 3 dB in the link margin with respect to K=7, the power consumption in the Viterbi decoder decreases by 81% by switching to K=3. Of course, other embodiments may results in greater or less reductions in power consumption.

TABLE 1

Eb/No for 1% PER and Power Consumed by Viterbi Decoder

| K | DCM Eb/No in dB | 4-D Eb/No in dB | VD Power in mW |
|---|---|---|---|
| 7 | 8.98 | 8.53 | 51.25 |
| 6 | 9.39 | 8.78 | 29.07 |
| 5 | 10.33 | 9.39 | 17.98 |
| 4 | 10.83 | 9.87 | 12.44 |

TABLE 1-continued

Eb/No for 1% PER and Power Consumed by Viterbi Decoder

| K | DCM Eb/No in dB | 4-D Eb/No in dB | VD Power in mW |
|---|---|---|---|
| 3 | 11.80 | 10.68 | 9.66 |
| No coding | 21.57 | 16.75 | 0 |

Example Algorithms and Simulations for Individual Data Rates

The example simulation results described below take into account power consumption of both the decoder and the deinterleaver (Deint). The example simulation results assume QPSK or DCM modulation at data rates of 320 Mbps, 400 Mbps, and 480 Mbps encoded with constraint lengths K=3, 4, 5, 6, and 7. Performance for 1% PER (Eb/No in dB) and power (in mW) consumed by both the decoder and the deinterleaver are presented for 480 Mbps, 400 Mbps, and 320 Mbps in Table 2, Table 3, and Table 4, respectively.

TABLE 2

Eb/No Points for 1% PER and Power for Deint + Decoder for 480 Mbps

| | Performance for 1% PER in dB | | Power for Deint + Decoder in mW | |
|---|---|---|---|---|
| K | QPSK | DCM | QPSK | DCM |
| 7 | 10.52 | 8.98 | 79.72 | 92.96 |
| 6 | 11.03 | 9.39 | 57.54 | 70.78 |
| 5 | 12.07 | 10.33 | 46.45 | 59.61 |
| 4 | 12.84 | 10.83 | 40.91 | 54.15 |
| 3 | 14.30 | 11.80 | 38.13 | 51.37 |

TABLE 3

Eb/No Points for 1% PER and Power for Deint + Decoder for 400 Mbps

| | Performance for 1% PER in dB | | Power for Deint + Decoder in mW | |
|---|---|---|---|---|
| K | QPSK | DCM | QPSK | DCM |
| 7 | 8.60 | 7.95 | 71.18 | 84.42 |
| 6 | 9.54 | 8.54 | 53.22 | 66.46 |
| 5 | 10.33 | 9.13 | 43.45 | 56.69 |
| 4 | 10.95 | 9.65 | 38.84 | 52.08 |
| 3 | 11.87 | 10.45 | 36.52 | 49.74 |

TABLE 4

Eb/No Points for 1% PER and Power for Deint + Decoder for 320 Mbps

| | Performance for 1% PER in dB | | Power for Deint + Decoder in mW | |
|---|---|---|---|---|
| K | QPSK | DCM | QPSK | DCM |
| 7 | 7.18 | 7.07 | 62.64 | 75.88 |
| 6 | 7.76 | 7.55 | 48.27 | 61.51 |
| 5 | 8.31 | 8.15 | 40.46 | 53.70 |
| 4 | 9.01 | 8.73 | 36.76 | 50.00 |
| 3 | 9.89 | 9.31 | 34.91 | 48.15 |

Figure 5:
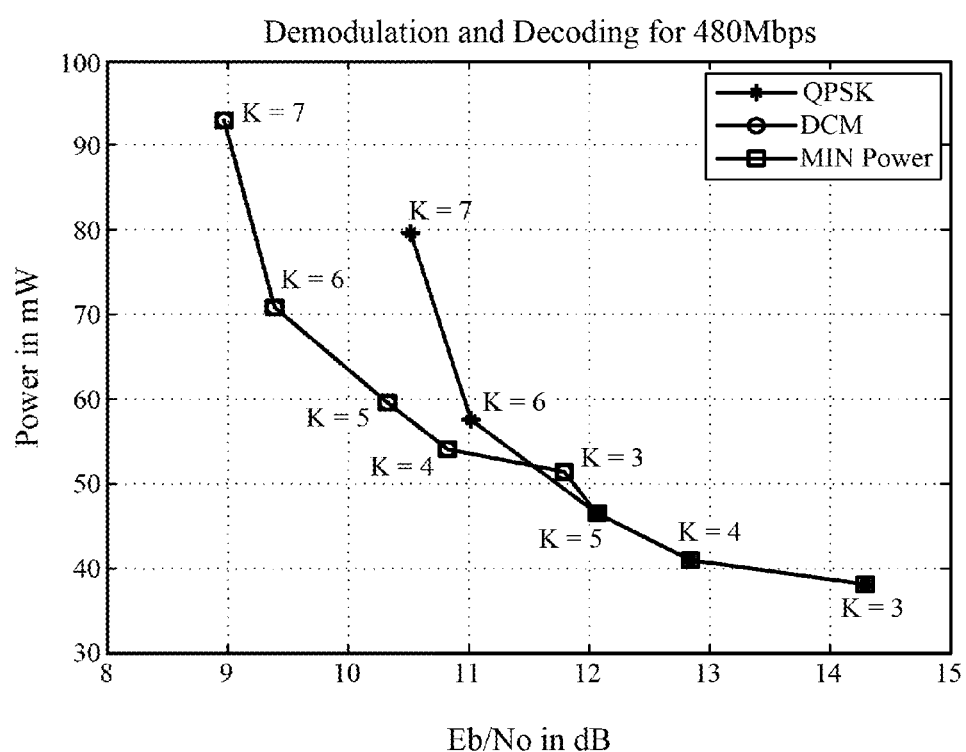
FIG. 5 is a graph of power (in mW) versus Eb/No (in dB) and shows example simulation results of communication at 480 Mbps using QPSK and DCM modulation. Also shown, is a curve (MIN Power) for the minimum of QPSK and DCM power at a given value of Eb/No. The value of the constraint length K is shown adjacent the data points shown in the graph.
Figure 6:
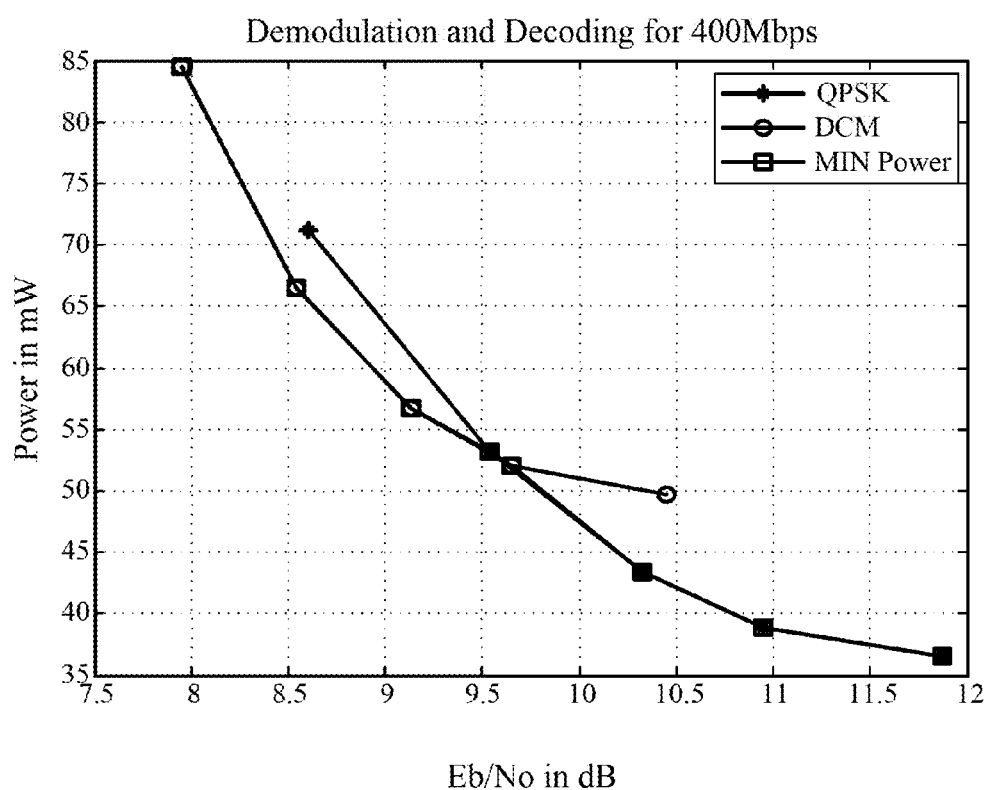
FIG. 6 is a graph of power (in mW) versus Eb/No (in dB) and shows example simulation results of communication at 400 Mbps using QPSK and DCM modulation. Also shown, is a curve (MIN Power) for the minimum of QPSK and DCM power at a given value of Eb/No.
Figure 7:
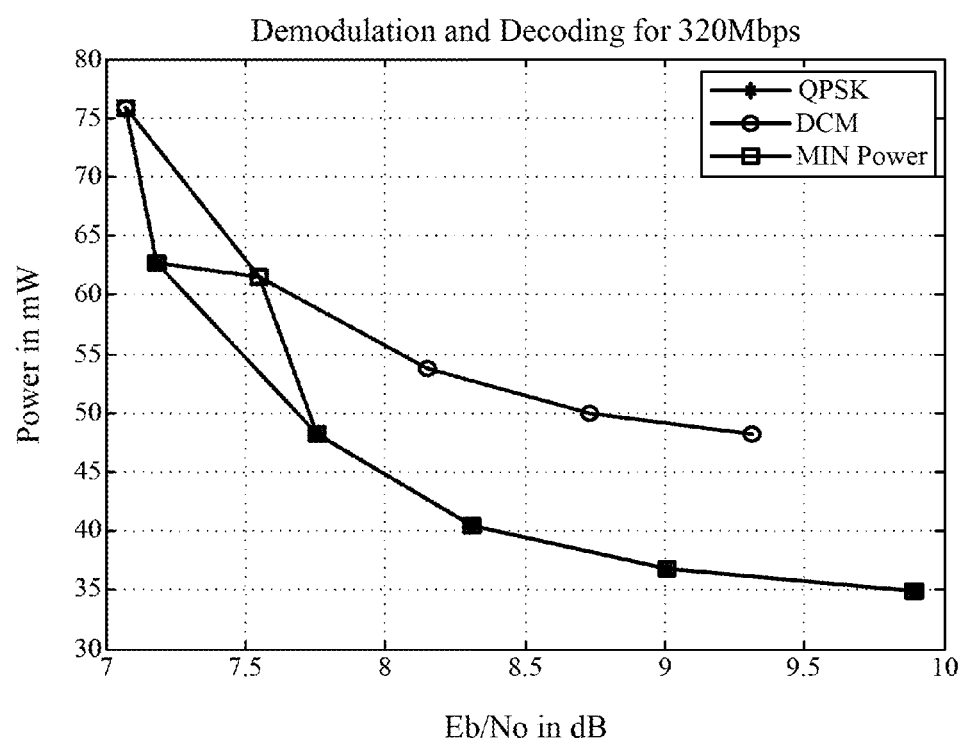
FIG. 7 is a graph of power (in mW) versus Eb/No (in dB) and shows example simulation results of communication at 320 Mbps using QPSK and DCM modulation. Also shown, is a curve (MIN Power) for the minimum of QPSK and DCM power at a given value of Eb/No.

FIGS. 5-7 are graphs of power (in mW) versus Eb/No (in dB) plotting the example simulation results of Tables 2-4, respectively, for QPSK and DCM modulated communication at 480 Mbps, 400 Mbps, and 320 Mbps, respectively. Also shown in each of FIGS. 5-7 is a curve (MIN Power) that shows the minimum of the QPSK and DCM power at a given value of Eb/No. The value of the constraint length K is shown adjacent the data points shown in the graph in FIG. 5. The example data presented in Tables 2, 3, and 4 and shown in FIGS. 2, 3, and 4 can be used by various embodiments to select a suitable convolutional code constraint length K and/or modulation type (e.g., QPSK or DCM) for use in encoding a communication signal at a particular data rate (e.g., 480 Mbps, 400 Mbps, or 320 Mbps). Selection of K and/or modulation type can be based on channel conditions so as to provide reduced power consumption (e.g., combined decoder and deinterleaver power consumption). In other embodiments, performance of a communication system operating at other data rates such as, e.g., 200 Mbps, 160 Mbps, 106.7 Mbps, 80 Mbps, and 53.3 Mbps, can be determined, and the performance results can be used to select K and/or modulation type based on channel conditions.

Various operating regimes and algorithms for determining operating parameters can be identified and/or characterized using data including, but not limited to, data such as presented in Tables 1-4 and FIGS. 4-7. As a first illustrative example, the modulation type and the constraint length K can be selected so that power consumed in the decoder and the deinterleaver is minimized at each value of Eb/No. For example, Table 2 and FIG. 5 (see, e.g., the MIN Power curve) show that for communication at a data rate of 480 Mbps, the encoder can use DCM with constraint length less than or equal to K=7 until K=3 is reached. At that point (e.g., at about 12 dB in FIG. 5), if there is more margin (e.g., as determined from channel conditions, such as interference, signal to noise ratio, etc.), the encoder, in this first example, switches from DCM to QPSK and uses a constraint length of K=5, 4, and 3 given more link margin.

As a second illustrative example, for a 400 Mbps data rate, the data in Table 3 and FIG. 6 show that the encoder can use DCM with reduced constraint length less than or equal to 7 until K=4 is reached (at about 9.6 dB0. In this second example, if there is more link margin, the encoder switches to QPSK modulation and uses a constraint length of K=6, 5, 4, and 3, given more margin.

As a third illustrative example, for a 320 Mbps data rate, the data in Table 4 and FIG. 7 show that the encoder can use QPSK modulation with a constraint length less than or equal to 7 without the need for switching to DCM. However, the example data in Table 4 show that QPSK with K=7 uses about 0.1 dB more margin than DCM with K=7. Therefore, in an embodiment using only QPSK modulation, about 0.1 dB more in link margin is needed in the worst case conditions. Given this small difference in link margin (at K=7) and the similar power consumption on the receiving side, either DCM or QPSK may be suitably used in various embodiments. The example data in Table 4 and FIG. 7 also show that DCM with K=6 results in slightly lower power consumption than QPSK with K=7. However, the difference is about 1 mW, and in various embodiments, either DCM (with K=6) or QPSK (with K=7) may be suitably used without an appreciable difference in power consumption.

Example Algorithms and Simulations for Combining Data Rates

The example simulations and example algorithms based on data shown in Tables 2-4 and FIGS. 5-7 considered the data rate to be held fixed as channel conditions varied. Example algorithms will now be described that cover a range of data rates. In other embodiments, additional or different algorithms may be used.

Table 5 provides an example collection of data based on the simulations described herein with reference to Tables 1-4 and FIGS. 4-7. In Table 5, values for Eb/No have been converted to SNR, and the data is arranged in ascending order of SNR (in dB), which is shown in column 1. Therefore, in certain embodiments of the disclosed methods and systems, for any particular value of SNR (e.g., measured by current channel conditions), any of the data rates in Table 5 that are above that particular SNR can be supported.

TABLE 5

| SNR (dB) | Rate (Mbps) | | Deint + Decode (mW) | (Deint + Decode)/ Rate (nJ/b) | PHY (mW) | PHY/ Rate (nJ/b) | PHY + MAC (mW) | (PHY + MAC)/ Rate (nJ/b) | Color Code |
|---|---|---|---|---|---|---|---|---|---|
| 6.49 | 320 | 320 DCM K = 7 | 75.88 | 0.237 | 159.88 | 0.500 | 226.547 | 0.708 | Black |
| 6.60 | 320 | 320 QPSK K = 7 | 62.64 | 0.196 | 146.64 | 0.458 | 213.307 | 0.667 | Black |
| 6.97 | 320 | 320 DCM K = 6 | 61.51 | 0.192 | 145.51 | 0.455 | 212.177 | 0.663 | Black |
| 7.18 | 320 | 320 QPSK K = 6 | 48.27 | 0.151 | 132.27 | 0.413 | 198.937 | 0.622 | Black |
| 7.73 | 320 | 320 QPSK K = 5 | 40.46 | 0.126 | 124.46 | 0.389 | 191.127 | 0.597 | Black |
| 8.34 | 400 | 400 DCM K = 7 | 84.42 | 0.211 | 168.42 | 0.421 | 251.753 | 0.629 | Red |
| 8.43 | 320 | 320 QPSK K = 4 | 36.76 | 0.115 | 120.76 | 0.377 | 187.427 | 0.586 | Black |
| 8.93 | 400 | 400 DCM K = 6 | 66.46 | 0.166 | 150.46 | 0.376 | 233.793 | 0.584 | Blue |
| 9.31 | 320 | 320 QPSK K = 3 | 34.91 | 0.109 | 118.91 | 0.372 | 185.577 | 0.580 | Black |

TABLE 5-continued

| SNR (dB) | Rate (Mbps) | | Deint + Decode (mW) | (Deint + Decode)/ Rate (nJ/b) | PHY (mW) | PHY/ Rate (nJ/b) | PHY + MAC (mW) | (PHY + MAC)/ Rate (nJ/b) | Color Code |
|---|---|---|---|---|---|---|---|---|---|
| 9.52 | 400 | 400 DCM K = 5 | 56.69 | 0.142 | 140.69 | 0.352 | 224.023 | 0.560 | Blue |
| 9.93 | 400 | 400 QPSK K = 6 | 53.22 | 0.133 | 137.22 | 0.343 | 220.553 | 0.551 | Blue |
| 10.04 | 400 | 400 DCM K = 4 | 52.08 | 0.130 | 136.08 | 0.340 | 219.413 | 0.549 | Blue |
| 10.16 | 480 | 480 DCM K = 7 | 92.96 | 0.194 | 178.96 | 0.373 | 278.960 | 0.581 | Red |
| 10.57 | 480 | 480 DCM K = 6 | 70.78 | 0.147 | 156.78 | 0.327 | 256.780 | 0.535 | Blue |
| 10.72 | 400 | 400, QPSK K = 5 | 43.45 | 0.109 | 127.45 | 0.319 | 210.783 | 0.527 | Black |
| 11.34 | 400 | 400 QPSK K = 4 | 38.84 | 0.097 | 122.84 | 0.307 | 206.173 | 0.515 | Black |
| 11.51 | 480 | 480 DCM K = 5 | 59.61 | 0.124 | 145.61 | 0.303 | 245.610 | 0.512 | Blue |
| 12.01 | 480 | 480 DCM K = 4 | 54.15 | 0.113 | 140.15 | 0.292 | 240.150 | 0.500 | Blue |
| 12.26 | 400 | 400 QPSK K = 3 | 36.52 | 0.091 | 120.52 | 0.301 | 203.853 | 0.510 | Red |
| 12.98 | 480 | 480 DCM K = 3 | 51.37 | 0.107 | 137.37 | 0.286 | 237.370 | 0.495 | Black |
| 13.25 | 480 | 480 QPSK K = 5 | 46.45 | 0.097 | 132.45 | 0.276 | 232.450 | 0.484 | Black |
| 14.02 | 480 | 480 QPSK K = 4 | 40.91 | 0.085 | 126.91 | 0.264 | 226.910 | 0.473 | Black |
| 15.48 | 480 | 480 QPSK K = 3 | 38.13 | 0.079 | 124.13 | 0.259 | 224.130 | 0.467 | Black |

The second column in Table 5 is the data rate (Rate) in Mbps. The third column is the combination of data rate, modulation type (e.g., QPSK or DCM), and constraint length K. The forth column is the power consumed (in mW) by the deinterleaver (Deint) and decoder (Decode). The fifth column is (Deint+Decode)/Rate in nJ/b. The sixth column is the power in mW consumed by the PHY layer. The seventh column is PHY/Rate in nJ/b. The eighth column is the power in mW consumed by the PHY layer and the MAC layer. To estimate power in the MAC layer, the simulation assumed 100 mW for a data rate of 480 Mbps and a linear proportion of that value for data rates of 400 Mbps and 320 Mbps. The ninth column is (PHY+MAC)/Rate in nJ/b.

The rows in Table 5 are marked by a color code shown in the tenth column. A "black" color code is used to represent regular rows. A "red" color code applies to rows that are less energy efficient than the row(s) above them. In some embodiments, rows color coded "red" are ignored in determining operational algorithms (due to their low energy efficiency). A "blue" color code applies to rows that are less energy efficient than the row(s) above them when only the value of (Deint+Decode)/Rate in column five is considered. However, when PHY/Rate (col. 7) and/or (PHY+MAC)/Rate (col. 9) are considered, the rows marked with color code "blue" are more energy efficient than the row(s) above them. Therefore, optionally, in certain embodiments, the rows marked with color code "blue" can be treated as regular (e.g., as rows color coded "black").

Example Embodiments of Algorithms

Examples of various illustrative algorithms for selecting constraint length K, modulation type (e.g., QPSK or DCM), and/or data rate will now be described. In other embodiments, other algorithms can be used. For example, algorithms can be determined for communication systems using modulation types in addition to or instead of QPSK and DCM (e.g., using 4-D, BPSK, QAM, etc.) and/or for transmission parameters in addition to or instead of constraint length (e.g., convolutional code rate, puncturing scheme, interleaving scheme, etc.). Additionally, channel conditions in addition to or instead of SNR can be considered.

Example Algorithm Based on Power

In this first illustrative example, data rate, constraint length, and modulation type are selected to provide the lowest power consumption on the receiving side at a given SNR. One or a combination of the power columns four, six, and eight shown in Table 5 can be used to identify the transmission parameters (e.g., Rate, K, modulation) providing least power consumption at a given SNR. For example, in one embodiment based at least in part on (Deint+Decode) power consumption, the only date rate used is 320 Mbps. At lower values of SNR (e.g., toward the top of Table 5), the transmitter uses DCM with K=7 at SNR levels at (or below) 6.49 dB, changes to QPSK with K=7 at 6.60 dB, changes to DCM with K=6 at 6.97 dB, changes to QPSK with K=6 at 7.18 dB, changes to QPSK with K=5 at 7.73 dB, changes to QPSK with K=4 at 8.43 dB, and changes to QPSK with K=3 at 9.31 dB. For this example, the last combination (e.g., 320 Mbps, QPSK, K=3) is the best that can be achieved in terms of power consumption in the deinterleaver and decoder regardless of whether the SNR exceeds 9.31 dB.

Table 6 provides data rate, modulation type, and constraint length and power and energy consumption in terms of SNR for this first illustrative embodiment.

TABLE 6

| SNR (dB) | Rate (Mbps) | | Deint + Decode (mW) | (Deint + Decode)/ Rate (nJ/b) | PHY (mW) | PHY/Rate (nJ/b) | PHY + MAC (mW) | (PHY + MAC)/ Rate (nJ/b) |
|---|---|---|---|---|---|---|---|---|
| 6.49 | 320 | 320, DCM, K = 7 | 75.88 | 0.237 | 159.88 | 0.500 | 226.547 | 0.708 |
| 6.60 | 320 | 320, QPSK, K = 7 | 62.64 | 0.196 | 146.64 | 0.458 | 213.307 | 0.667 |
| 6.97 | 320 | 320, DCM, K = 6 | 61.51 | 0.192 | 145.51 | 0.455 | 212.177 | 0.663 |
| 7.18 | 320 | 320, QPSK, K = 6 | 48.27 | 0.151 | 132.27 | 0.413 | 198.937 | 0.622 |
| 7.73 | 320 | 320, QPSK, K = 5 | 40.46 | 0.126 | 124.46 | 0.389 | 191.127 | 0.597 |
| 8.43 | 320 | 320, QPSK, K = 4 | 36.76 | 0.115 | 120.76 | 0.377 | 187.427 | 0.586 |
| 9.31 | 320 | 320, QPSK, K = 3 | 34.91 | 0.109 | 118.91 | 0.372 | 185.577 | 0.580 |

Example Algorithm Based on Energy

In this second illustrative example, data rate, constraint length, and/or modulation type are selected to provide the lowest energy at a given SNR. One or a combination of the energy columns seven and nine shown in Table 5 can be used to identify the transmission parameters (e.g., Rate, K, modulation type) providing least energy as SNR increases. In this example, rows color coded "red" in Table 5 are ignored. This example algorithm advantageously provides for optimization and/or enhancement of the energy per bit for a given SNR. Table 6 provides data rate, modulation type, and constraint length and power and energy consumption in terms of SNR for this second illustrative embodiment.

TABLE 7

| SNR (dB) | Rate (Mbps) | | Deint + Decode (mW) | (Deint + Decode)/ Rate (nJ/b) | PHY (mW) | PHY/ Rate (nJ/b) | PHY + MAC (mW) | (PHY + MAC)/ Rate (nJ/b) |
|---|---|---|---|---|---|---|---|---|
| 6.49 | 320 | 320, DCM, K = 7 | 75.88 | 0.237 | 159.88 | 0.500 | 226.547 | 0.708 |
| 6.60 | 320 | 320, QPSK, K = 7 | 62.64 | 0.196 | 146.64 | 0.458 | 213.307 | 0.667 |
| 6.97 | 320 | 320, DCM, K = 6 | 61.51 | 0.192 | 145.51 | 0.455 | 212.177 | 0.663 |
| 7.18 | 320 | 320, QPSK, K = 6 | 48.27 | 0.151 | 132.27 | 0.413 | 198.937 | 0.622 |
| 7.73 | 320 | 320, QPSK, K = 5 | 40.46 | 0.126 | 124.46 | 0.389 | 191.127 | 0.597 |
| 8.43 | 320 | 320, QPSK, K = 4 | 36.76 | 0.115 | 120.76 | 0.377 | 187.427 | 0.586 |
| 8.93 | 400 | 400, DCM, K = 6 | 66.46 | 0.166 | 150.46 | 0.376 | 233.793 | 0.584 |
| 9.31 | 320 | 320, QPSK, K = 3 | 34.91 | 0.109 | 118.91 | 0.372 | 185.577 | 0.580 |
| 9.52 | 400 | 400, DCM, K = 5 | 56.69 | 0.142 | 140.69 | 0.352 | 224.023 | 0.560 |

TABLE 7-continued

| SNR (dB) | Rate (Mbps) | | Deint + Decode (mW) | (Deint + Decode)/ Rate (nJ/b) | PHY (mW) | PHY/ Rate (nJ/b) | PHY + MAC (mW) | (PHY + MAC)/ Rate (nJ/b) |
|---|---|---|---|---|---|---|---|---|
| 9.93 | 400 | 400, QPSK, K = 6 | 53.22 | 0.133 | 137.22 | 0.343 | 220.553 | 0.551 |
| 10.04 | 400 | 400, DCM, K = 4 | 52.08 | 0.130 | 136.08 | 0.340 | 219.413 | 0.549 |
| 10.57 | 480 | 480, DCM, K = 6 | 70.78 | 0.147 | 156.78 | 0.327 | 256.780 | 0.535 |
| 10.72 | 400 | 400, QPSK, K = 5 | 43.45 | 0.109 | 127.45 | 0.319 | 210.783 | 0.527 |
| 11.34 | 400 | 400, QPSK, K = 4 | 38.84 | 0.097 | 122.84 | 0.307 | 206.173 | 0.515 |
| 11.51 | 480 | 480, DCM, K = 5 | 59.61 | 0.124 | 145.61 | 0.303 | 245.610 | 0.512 |
| 12.01 | 480 | 480, DCM, K = 4 | 54.15 | 0.113 | 140.15 | 0.292 | 240.150 | 0.500 |
| 12.98 | 480 | 480, DCM, K = 3 | 51.37 | 0.107 | 137.37 | 0.286 | 237.370 | 0.495 |
| 13.25 | 480 | 480, QPSK, K = 5 | 46.45 | 0.097 | 132.45 | 0.276 | 232.450 | 0.484 |
| 14.02 | 480 | 480, QPSK, K = 4 | 40.91 | 0.085 | 126.91 | 0.264 | 226.910 | 0.473 |
| 15.48 | 480 | 480, QPSK, K = 3 | 38.13 | 0.079 | 124.13 | 0.259 | 224.130 | 0.467 |

As described above (see, e.g., Table 6), the first example algorithm based on minimum power uses only the 320 Mbps data rate. This second example algorithm based on minimum energy (see, e.g., Table 7) switches among data rates of 320 Mbps, 400 Mbps, and 480 Mbps.

Example Algorithm Based on Energy, Power, and/or SNR

As can be seen from the data in columns one and two of Table 7, an increase in SNR does not necessarily mean that a higher data rate is selected in systems utilizing embodiments of the second example algorithm. For example, at an SNR of 9.31 dB, the second example algorithm indicates the data rate is reduced from 400 Mbps to 320 Mbps. Also, at an SNR of 10.72 dB, the second example algorithm indicates the data rate is reduced from 480 Mbps to 400 Mbps. However, the example data in Table 7 show that range of SNR over which the lower data rate is applicable is relatively small. Also, reductions in power consumption or energy per bit achieved by switching to the lower data rate may relatively modest.

Accordingly, certain embodiments of the algorithm do not switch to from higher to lower data rates as SNR increases. For example, in one embodiment, instead of switching from a data rate of 320 Mbps to a data rate of 400 Mbps at 8.93 dB (as indicated by the second example algorithm), the data rate is maintained at 320 Mbps using QPSK modulation with K=4 (which are the transmission parameters one row above the 400 Mbps row at 8.93 dB). The difference in PHY/Rate for embodiments using the lower 320 Mbps data rate is only about 0.01 nJ/b. As SNR increases to 9.31 dB, the data rate remains at 320 Mbps, the modulation type remains QPSK, but the constraint length decreases to K=3.

As another example, the data shown in Table 7 indicate that the data rate of 480 Mbps is applicable only for a range of 0.15 dB from 10.57 dB to 10.72 dB. Therefore, in certain embodiments, the data rate of 480 Mbps is not used in this SNR range, and a data rate of 400 Mbps, modulation type DCM, and constraint length K=4 are used (the values one row above the 480 Mbps row at 10.57 dB).

Accordingly, a third embodiment of the algorithm provides a simplified switching scheme in which data rate increases monotonically with SNR. Table 8 provides data rate, modulation type, and constraint length and power and energy consumption in terms of SNR for this third illustrative embodiment of the algorithm.

TABLE 8

| SNR (dB) | Rate (Mbps) | | Deint + Decode (mW) | (Deint + Decode)/ Rate (nJ/b) | PHY (mW) | PHY/ Rate (nJ/b) | PHY + MAC (mW) | (PHY + MAC)/ Rate (nJ/b) |
|---|---|---|---|---|---|---|---|---|
| 6.60 | 320 | 320, QPSK, K = 7 | 62.64 | 0.196 | 146.64 | 0.458 | 213.307 | 0.667 |
| 7.18 | 320 | 320, QPSK, K = 6 | 48.27 | 0.151 | 132.27 | 0.413 | 198.937 | 0.622 |
| 7.73 | 320 | 320, QPSK, K = 5 | 40.46 | 0.126 | 124.46 | 0.389 | 191.127 | 0.597 |
| 8.43 | 320 | 320, QPSK, K = 4 | 36.76 | 0.115 | 120.76 | 0.377 | 187.427 | 0.586 |
| 9.31 | 320 | 320, QPSK, K = 3 | 34.91 | 0.109 | 118.91 | 0.372 | 185.577 | 0.580 |
| 9.52 | 400 | 400, DCM, K = 5 | 56.69 | 0.142 | 140.69 | 0.352 | 224.023 | 0.560 |
| 9.93 | 400 | 400, QPSK, K = 6 | 53.22 | 0.133 | 137.22 | 0.343 | 220.553 | 0.551 |

TABLE 8-continued

| SNR (dB) | Rate (Mbps) | | Deint + Decode (mW) | (Deint + Decode)/ Rate (nJ/b) | PHY (mW) | PHY/ Rate (nJ/b) | PHY + MAC (mW) | (PHY + MAC)/ Rate (nJ/b) |
|---|---|---|---|---|---|---|---|---|
| 10.04 | 400 | 400, DCM, K = 4 | 52.08 | 0.130 | 136.08 | 0.340 | 219.413 | 0.549 |
| 10.72 | 400 | 400, QPSK, K = 5 | 43.45 | 0.109 | 127.45 | 0.319 | 210.783 | 0.527 |
| 11.34 | 400 | 400, QPSK, K = 4 | 38.84 | 0.097 | 122.84 | 0.307 | 206.173 | 0.515 |
| 11.51 | 480 | 480, DCM, K = 5 | 59.61 | 0.124 | 145.61 | 0.303 | 245.610 | 0.512 |
| 12.01 | 480 | 480, DCM, K = 4 | 54.15 | 0.113 | 140.15 | 0.292 | 240.150 | 0.500 |
| 12.98 | 480 | 480, DCM, K = 3 | 51.37 | 0.107 | 137.37 | 0.286 | 237.370 | 0.495 |
| 13.25 | 480 | 480, QPSK, K = 5 | 46.45 | 0.097 | 132.45 | 0.276 | 232.450 | 0.484 |
| 14.02 | 480 | 480, QPSK, K = 4 | 40.91 | 0.085 | 126.91 | 0.264 | 226.910 | 0.473 |
| 15.48 | 480 | 480, QPSK, K = 3 | 38.13 | 0.079 | 124.13 | 0.259 | 224.130 | 0.467 |

Observations Based on the Example Algorithms

In some embodiments, selection of data rate and selection of modulation type (e.g., QPSK or DCM) and/or constraint length can be separated (e.g., the third example algorithm described with reference to Table 8). For example, in the third example algorithm, in the SNR range from 6.60 dB to 9.52 dB, the 320 Mbps data rate is selected, in the SNR range from 9.52 dB to 11.51 dB, the 400 Mbps data rate is selected, and for SNR greater than or equal to 11.51 dB, the 480 Mbps data rate is selected. Within each of these SNR ranges, modulation type and/or constraint length may (but need not) vary depending on channel conditions (e.g., SNR). For example, the example in Table 8 shows that DCM is not used for transmission at 320 Mbps and that encoding/decoding at a K=7 constraint length need only be implemented for 320 Mbps transmission. Also, in this example, constraint lengths K=6 and K=7 do not need to be implemented for transmission at 480 Mbps. Accordingly, certain embodiments of the disclosed methods and systems can advantageously increase implementation efficiency by exploiting such characteristics of an algorithm.

Certain embodiments of the selection/switching algorithm advantageously can eliminate transmission modes that consume the most power (e.g., by not using or switching to these modes). In the foregoing examples, transmission modes with high (Deint+Decode) power consumption include: 480 Mbps, DCM, K=7 using 92.96 mW; 400 Mbps, DCM, K=7 using 84.42 mW; 320 Mbps, DCM, K=7 using 75.88 mW; 480 Mbps, DCM, K=6 using 70.78 mW. By eliminating these modes, for example, the peak power may be reduced from 92.96 mW to 62.64 mW, which is a 33% reduction in (Deint+Decode) power consumption.

The foregoing data and algorithms are intended as examples. Other algorithms can be determined based on the foregoing (or other) data. For example, in other embodiments, additional or different combinations of data rate, modulation type, and/or constraint length than described above can be eliminated from the algorithm. In some embodiments, a separation of, e.g., 0.5 dB or 1 dB in SNR, is used between combinations of data rate, modulation type, and/or constraint length. In certain embodiments, a plurality of transmission parameter combinations are relatively close to each other in terms of a channel condition such as, for example, SNR. In certain such embodiments, one of the combinations can be selected for use and the remaining combinations can be eliminated, which advantageously can increase implementation efficiency. Other variations of the above examples are possible.

Figure 8:
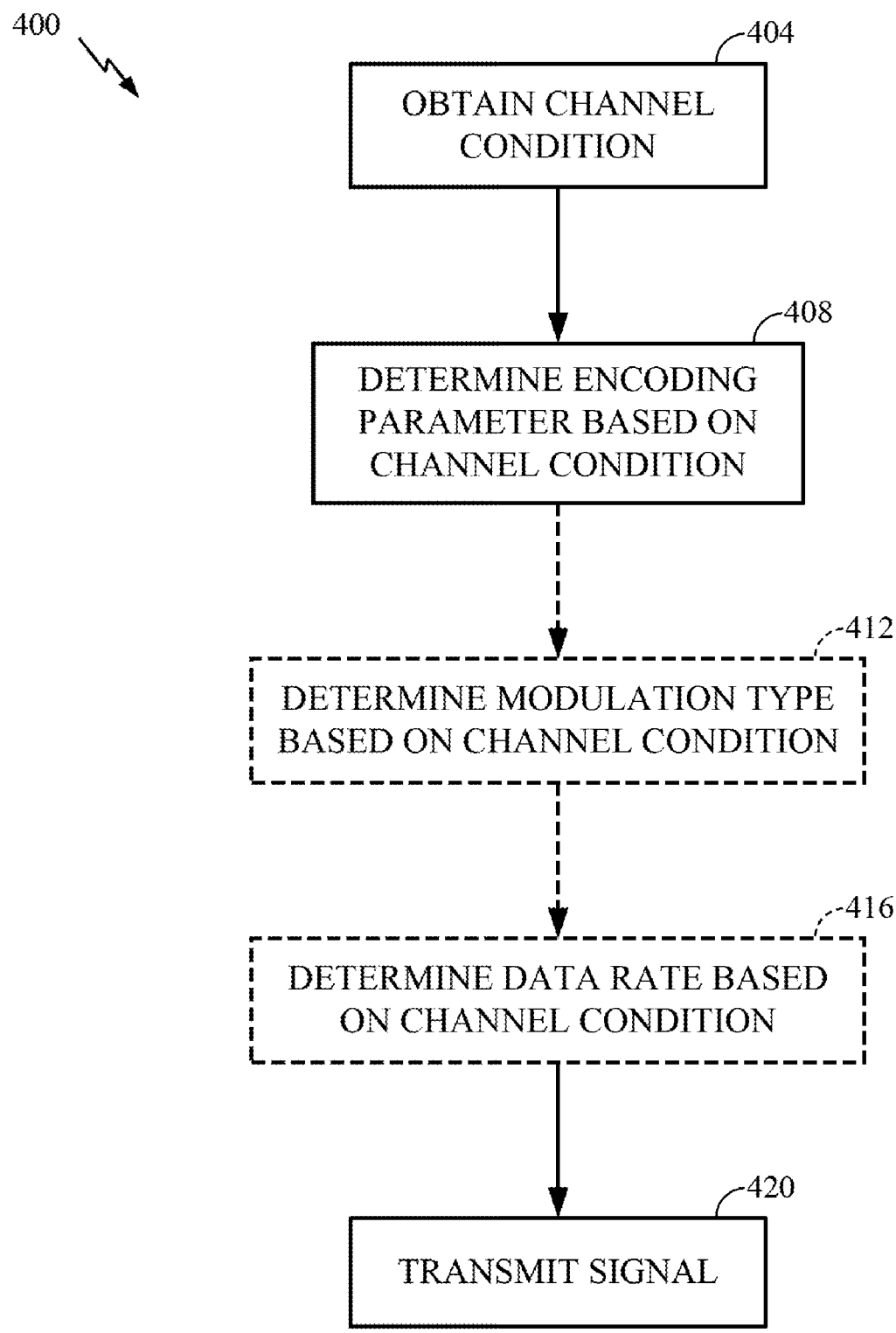
FIG. 8 is a flow diagram illustrating an example method for selecting one or more transmission parameters of a communication system based at least in part on a channel condition.

FIG. 8 is a flow diagram of an embodiment of a method 400 for selecting one or more transmission parameters of a communication system based at least in part on a channel condition. In state 404, a channel condition is obtained by the transmitting device. The channel condition may comprise SNR, frequency response, noise variance, QoS, interference, RSSI, Eb/No, BLER, PER, BER, LQI, ACK/NACK, and so forth. In some embodiments, the channel condition is determined at the receiving side of a communications link. Information related to the channel condition can be communicated (e.g., wirelessly) to the transmitting side of the communications link. Thus, in some such embodiments, the receiving side provides feedback information to the transmitting side of the communications link, and the feedback information is used to obtain the channel condition.

In certain system implementation, implicit feedback information can be used to estimate the channel condition, optionally in addition to explicit channel condition information. For example, after transmitting a data packet, the transmitting device may wait for an acknowledgement message from the receiving device before transmitting the next data packet. The acknowledgement message can be determined according to an acknowledgement policy established by the communications standard (e.g., ACK, NACK, etc.). In some embodiments, if the acknowledgment message is not received, the transmitting device assumes the channel conditions have degraded, and the transmitting device updates an estimate of current channel conditions (e.g., by decrementing an SNR).

For example, in one example implementation based on the third example algorithm described with reference to Table 8, at the inception of the communications link, the transmitting device assumes the channel condition is representative of an SNR in the middle of the table (e.g., an SNR of 10.04 dB) and begins to transmit data packets (e.g., at 400 Mbps using DCM with K=4). If acknowledgment messages are not received, the transmitting device assumes the channel conditions are worse than had been assumed, and the transmitting device retransmits the data packets using transmission parameters corresponding to smaller values of SNR in Table 8. For example, the transmitting device may "move up" one or more rows in Table 8 and retransmit the data packets (using the transmission parameters corresponding to that row) each time an acknowledgement message is not received. In this example, the transmitting device continues to "move up" in Table 8 and retransmit data packets until an acknowledgment message is received from the receiving device. In some implementations, if an acknowledgment message is not received, the transmitter assumes the worst case channel condition (e.g., by jumping to the top of Table 8).

When acknowledgment messages are received from the receiving device, some embodiments of the transmitting device assume channel conditions have improved. The transmitting device transmits subsequent data packets with transmission parameters corresponding to a larger SNR (e.g., by "moving down" one or more rows in Table 8). Accordingly, transmitting devices configured to use embodiments of this implicit feedback process advantageously can dynamically adjust an estimate of channel conditions based on whether or not acknowledgment messages are received from the receiving device.

In some short range communication links, reciprocity between the transmitting side and the receiving side implies that channel conditions on the transmitting side are similar to channel conditions on the receiving side. Therefore, in some embodiments, a channel condition estimated by the transmitting device is used as a proxy for the channel condition at the receiving device. For example, the transmitting device may comprise a transceiver that includes both a transmitter and a receiver. The channel condition can be estimated by the channel estimator 332 in the receiver of the transceiver rather than by a channel estimate communicated by the receiving device.

In other system implementations, the channel condition may be determined based at least in part on an estimate of channel conditions received from the receiving device (e.g., via feedback information) and on an estimate of channel conditions by the transmitting device (e.g., via implicit feedback information and/or reciprocity).

Continuing with the example method 400, in state 408, an encoding parameter (e.g., a convolutional constraint length K) is identified or selected based at least in part on the channel condition(s) obtained in state 404. In some embodiments of the method 400, in optional states 412 and/or 416, a modulation type (e.g., QPSK or DCM) and/or a data rate (e.g., 480 Mbps, 400 Mbps, or 320 Mbps), respectively, may be identified or selected based at least in part on the channel condition(s) obtained in state 404.

In certain embodiments, a table, formula, or algorithm may be used to determine the encoding parameter, modulation type, and/or data rate based at least in part on a value of the channel condition. As described herein, certain embodiments may compare the obtained channel condition (e.g., an SNR) to one or more of a set of values of SNR in a table and, based on the comparison, identify or select a suitable set of transmission parameters (e.g., data rate, constraint length, and/or modulation type).

In various embodiments, the method 400 can be performed by the controller 228 of the PHY processor 108a described with reference to FIG. 2. For example, the controller 228 can receive information on channel conditions from a receiving device. Based at least in part on one or more of the channel conditions, the controller 228 can identify or select a constraint length for use by the encoder 204 and/or a modulation type for use by the mapper 216. At state 420, the transmitting device can use the identified/selected parameters to transmit a communication signal to the receiving device. As described herein, the transmission parameter(s) identified/selected by the controller 228 advantageously may, in various embodiments, provide reduced power consumption by the receiving device, optimized or enhanced energy per received bit, and/or other benefits.

Figure 9:
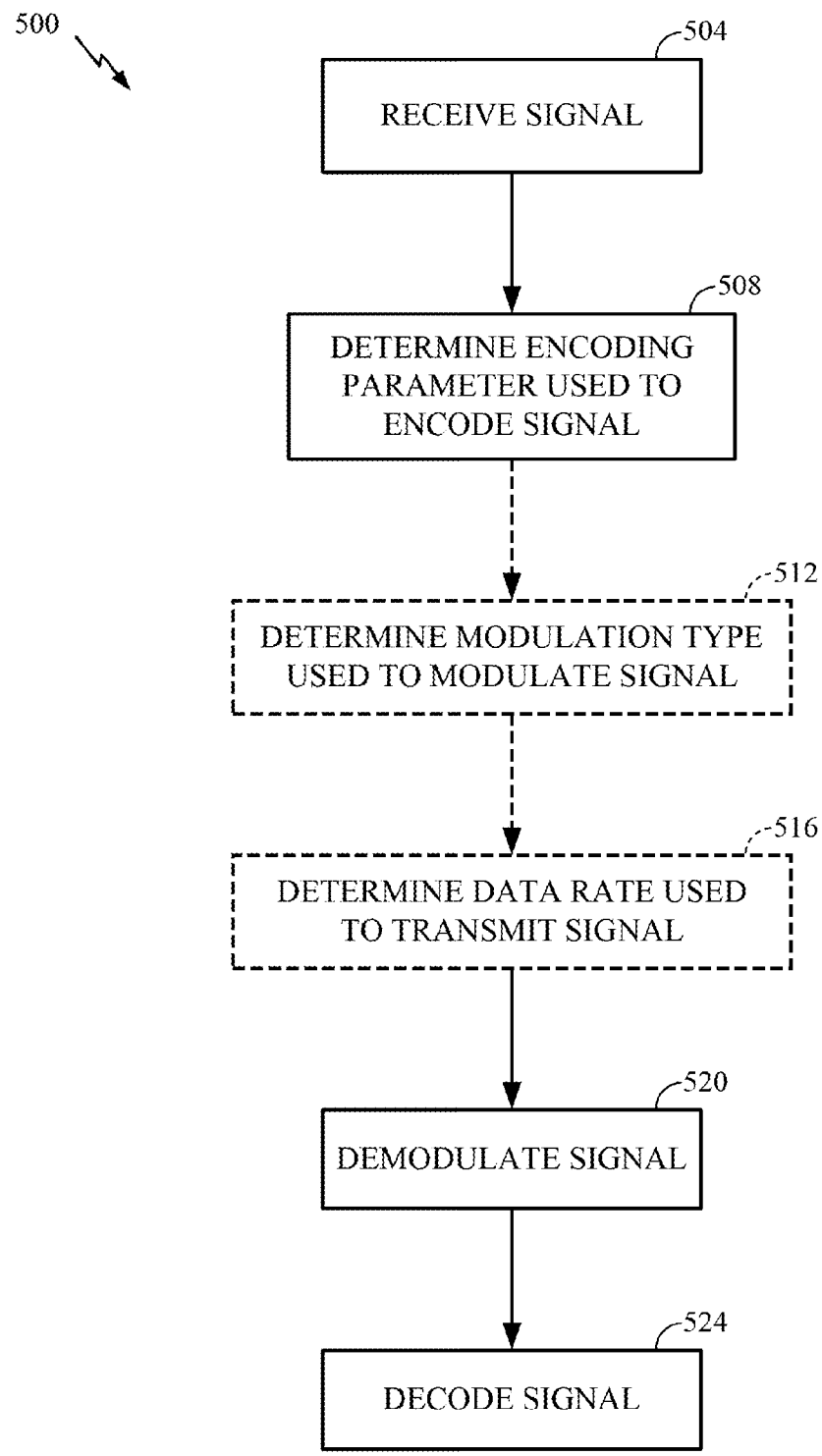
FIG. 9 is a flow diagram illustrating an example method for receiving and decoding a communication signal transmitted by a transmitting device configured with a variable constraint length convolutional encoder.

FIG. 9 is a flow diagram of an embodiment of a method 500 for receiving and decoding a communication signal transmitted by a transmitting device configured with a variable constraint length convolutional encoder. In state 504, a receiving device receives the signal from a transmitting device that has encoded the signal with a variable constraint length convolutional code K. For example, the signal can be transmitted by a transmitting device configured to implement an embodiment of the method 400 described with reference to FIG. 9.

In state 508, the encoding parameter used to encode the signal (e.g., the constraint length K) is determined. For example, in certain embodiments, the signal is transmitted with a header that includes information representing the encoding parameter (e.g., the constraint length). The receiving device can determine the encoding parameter used to encode the signal from the header. In certain such embodiments, the information representing the encoding parameter may be included in a PHY and/or MAC header in a transmitted frame of the signal. For example, in an illustrative embodiment using a standard such as, e.g., the ECMA-368 standard, one or more bits whose values are not specified by the standard (e.g., reserved bits/user-defined bits) may be used to store information related to the encoding parameter. In some embodiments of the method 500, in optional states 512 and/or 516, the modulation type and/or the data rate, respectively, for the signal are determined. In some such embodiments, the modulation type and/or the data rate may also be stored in the header.

In various embodiments, the method 500 can be performed by the controller 328 of the PHY processor 108b described with reference to FIG. 3. For example, the controller 328 can be configured to process the header of the received signal and determine the encoding parameter, the modulation type, and/or the data rate. The received signal is demodulated in state 520 and decoded in state 524 of the example method 500. For example, the decoder 304 can use the constraint length K determined by the controller 328 (e.g., from the signal header) to decode the received signal.

Accordingly, embodiments of the decoder 304 may be configured with a plurality of decoding algorithms capable of decoding signals encoded by a variable constraint length encoder. For example, the decoder 304 may be configured to decode a signal encoded with constraint lengths including, for example, K=7, K=6, K=5, K=4, and/or K=3. In other embodiments, the decoder 304 may be configured to decode signals encoded with a constraint length selected from a range of K (e.g., K=3 to 9) and/or from a set of particular K values (e.g., K=3, 5, 6, and 8). In some embodiments, the decoder 304 may comprise decoding circuitry configured to be able to decode a signal encoded with any of the constraint lengths that can be selected by the variable constraint length encoder described herein (e.g., K=3 to 7 in some implementations). In other embodiments, the decoder 304 may comprise separate decoder circuitry for each of the possible constraint lengths, e.g., decoding circuitry for K=7, decoding circuitry for K=6, decoding circuitry for K=5, and so forth. In some embodiments, a combination of such possible decoding approaches can be taken such as, for example, decoding circuitry for a range of K values (e.g., K=3-6) and decoding circuitry for one or more individual K values (e.g., K=7). In certain embodiments, the decoder 304 implements a Viterbi decoding algorithm to decode signals encoded with one or more of the possible K values used by the variable constraint length encoder. In other embodiments, the decoder 304 may implement additional and/or alternative decoding algorithms (e.g., a Fano algorithm). Many decoder variations are possible.

Therefore, embodiments of the decoder 304 advantageously can dynamically select the constraint length used for decoding the received signal based on the constraint length dynamically selected by the transmitting device to encode the transmitted signal.

Embodiments of the communication systems, transmitting devices, and/or receiving devices advantageously may be configured to be compatible with communications standards that may or may not support variable constraint length encoding and decoding described herein. For example, in some implementations, a handshake protocol is used in which the transmitting device transmits a query to determine whether the receiving device is capable of variable constraint length decoding. If the receiving device is capable of decoding such signals, the receiving device transmits a suitable response to the transmitting device, which then begins transmitting variable constraint length encoded signals. If the response is not received, the transmitting device transmits signals according to a fixed constraint length communications standard (e.g., ECMA-368 with K=7). In some implementations, the transmitting device periodically resends the variable constraint length query to the receiving device in case, for example, the response to an earlier query was lost, the receiving device switches from a fixed constraint length radio to a variable constraint length radio, and so forth. In some implementations of the communication system, the handshake protocol uses an embodiment of a Request-to-Send/Clear-to-Send (RTS/CTS) protocol to determine whether the receiving device is capable of decoding variable constraint length encoded signals.

In one or more example embodiments, the functions, states, methods, algorithms, and techniques described herein may be implemented in hardware, software, firmware (e.g., including code segments), or any combination thereof. If implemented in software, the functions may be stored on or transmitted over as one or more instructions or code on a computer-readable medium. Tables, data structures, formulas, and so forth may be stored on a computer-readable medium. Computer-readable media include both computer-readable storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, one or more processing units at a transmitter and/or a receiver may be implemented within one or more computing devices including, but not limited to, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques described herein may be implemented with code segments (e.g., modules) that perform the functions described herein. The software codes may be stored in memory units and executed by processors. The memory unit may be implemented within the processor or external to the processor, in which case it can be communicatively coupled to the processor via various means as is known in the art. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Although certain embodiments and examples are discussed herein, it is understood that the inventive subject matter extends beyond the specifically disclosed embodiments and examples to other alternative embodiments and uses and to obvious modifications and equivalents thereof. Thus, it is intended that the scope of the disclosure should not be limited by the particular disclosed embodiments and examples. For example, in any method or process disclosed herein, the acts, steps, or operations making up the method/process may be performed in any suitable sequence and are not necessarily limited to any particular disclosed sequence. Also, acts, steps, or operations may be added, removed, combined, or rearranged in other method/process embodiments. In systems and devices disclosed herein, components may be added, removed, combined, and/or arranged differently than described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein.

What is claimed is:

1. A method for determining a convolutional code constraint length for use in transmitting a communication signal during a data session with a first radio, the method comprising:

obtaining a channel condition for a channel associated with transmission of the communication signal during the data session with the first radio;

comparing the channel condition to a threshold channel condition; and based at least in part on the channel condition and the comparison, dynamically selecting, from a plurality of convolutional code constraint lengths, a convolutional code constraint length to be used for encoding the communication signal, wherein the dynamical selection of the convolutional constraint length is performed via execution of instructions by a computing device.

2. The method of claim 1, wherein the convolutional code constraint length is selected based in part on power consumption estimate information with respect to a convolutional decoder.

3. The method of claim 1, wherein the first radio comprises PHY and MAC circuitry operable to communicate the communication signal using an ultra wideband (UWB) network.

4. The method of claim 3, wherein the UWB network is capable of communicating signals compliant with the ECMA-368 standard.

5. The method of claim 1, wherein the first radio comprises PHY and MAC circuitry operable to communicate the communication signal using a wireless wide area network (WWAN).

6. The method of claim 1, wherein the first radio comprises PHY and MAC circuitry operable to communicate the communication signal using a wireless local area network (WLAN).

7. The method of claim 1, wherein the channel condition comprises information relating to at least one of a signal-to-noise ratio, a quality of service indicator, a link quality indicator, an error rate, a received signal strength indicator, an acknowledgement message, or an interference indicator.

8. The method of claim 7, wherein the channel condition information comprises the signal-to-noise ratio information.

9. The method of claim 1, wherein obtaining the channel condition comprises receiving channel condition information communicated from a receiving device.

10. The method of claim 1, wherein obtaining the channel condition comprises estimating channel condition information in a transmitting device configured to transmit the communication signal.

11. The method of claim 1, wherein obtaining the channel condition comprises determining whether an acknowledgment message has been received from a receiving device operable to receive the communication signal during the data session.

12. The method of claim 1, further comprising selecting, based at least in part on the channel condition, a modulation type to be used for modulating the communication signal.

13. The method of claim 1, further comprising selecting, based at least in part on the channel condition, a data rate to be used for transmitting the communication signal.

14. The method of claim 1, further comprising accessing a data structure or evaluating a formula or algorithm to select the constraint length associated with the threshold channel condition.

15. The method of claim 1, further comprising communicating the selected constraint length to a convolutional encoder configured to encode the communication signal with the selected constraint length.

16. A computer program product, comprising:
a computer-readable medium comprising:
code operable to cause a computer to obtain a channel condition for a channel associated with transmission of a communication signal during a data session with a first radio;
code operable to compare the channel condition to a threshold channel condition; and
code operable to cause a computer to, based at least in part on the channel condition and the comparison, dynamically select, from a plurality of convolutional code constraint lengths, a convolutional code constraint length to be used for encoding the communication signal.

17. A wireless communication apparatus comprising:
a transmitting device configured to transmit a communication signal during a data session with a first radio, the transmitting device comprising a circuit configured to determine a convolutional code constraint length for use in transmitting the communication signal, the circuit configured to:
obtain a channel condition for a channel associated with transmission of the communication signal during the data session with the first radio;
compare the channel condition to a threshold channel condition; and
based at least in part on the channel condition and the comparison, dynamically select, from a plurality of convolutional code constraint lengths, a convolutional code constraint length to be used for encoding the communication signal.

18. The wireless communication apparatus of claim 17, wherein the circuit is configured to select the convolutional code constraint length based in part on power consumption estimate information with respect to a convolutional decoder.

19. The wireless communication apparatus of claim 18, wherein the circuit is further configured to obtain the channel condition based at least in part on channel condition information received from a receiving device.

20. The wireless communication apparatus of claim 17, wherein the transmitting device further comprises a convolutional encoder for encoding the communication signal, and the circuit is further configured to communicate the selected convolutional code constraint length to the convolutional encoder.

21. An apparatus for determining a convolutional code constraint length for use in transmitting a communication signal during a data session with a first radio, the apparatus comprising:
means for obtaining a channel condition for a channel associated with transmission of the communication signal during the data session with the first radio;
means for comparing the channel condition to a threshold channel condition; and
means for dynamically selecting from a plurality of convolutional code constraint lengths, based at least in part on the channel condition and the comparison, a convolutional code constraint length to be used for encoding the communication signal.

22. The apparatus of claim 21, wherein the obtaining means and the se3lecting means comprise one or more circuits.

23. The apparatus of claim 21, wherein the first radio comprises PHY and MAC circuitry operable to communicate the communication signal using an ultra wideband (UWB) network.

24. The apparatus of claim 23, wherein the UWB network is capable of communicating signals compliant with the ECMA-368 standard.

25. The apparatus of claim 21, wherein the first radio comprises PHY and MAC circuitry operable to communicate the communication signal using a wireless wide area network (WWAN).

26. The apparatus of claim 21, wherein the first radio comprises PHY and MAC circuitry operable to communicate the communication signal using a wireless local area network (WLAN).

27. The apparatus of claim 21, wherein the selecting means is configured to select the convolutional code constraint length based in part on power consumption estimate information with respect to a convolutional decoder.

28. The apparatus of claim 21, further comprising means for selecting, based at least in part on the channel condition, a modulation type to be used for modulating the communication signal.

29. The apparatus of claim 21, further comprising means for selecting, based at least in part on the channel condition, a data rate to be used for transmitting the communication signal.

30. The apparatus of claim 21, further comprising means for encoding the communication signal, the selecting means configured to communicate the selected convolutional code constraint length to the encoding means.

31. A processing apparatus for a wireless network configured to transmit a communication signal during a data session with a first radio, the processing apparatus comprising:
a memory for storing a channel condition for a channel associated with transmission of the communication signal and a plurality of convolutional code constraint lengths; and
a processor configured to:
compare the channel condition to a threshold channel condition; and
dynamically select from the plurality of convolutional code constraint lengths, based at least in part on the channel condition and the comparison, a convolutional code constraint length for encoding the communication signal.

32. A method for decoding a communication signal received during a data session with a first radio, the communication signal encoded with a convolutional code constraint length selected from a plurality of convolutional code constraint lengths, the method comprising:
receiving from a transmitting device an inquiry whether the communication signal encoded with the convolutional code constraint length selected from the plurality of convolutional code constraint lengths can be dynamically decoded;
communicating to the transmitting device a response indicative of whether the communication signal can be dynamically decoded;
during the data session with the first radio, dynamically determining the convolutional code constraint length used to encode the communication signal; and
decoding the communication signal based at least in part on the dynamically determined convolutional code constraint length,
wherein the dynamically determining and the decoding are performed via execution of instructions by a computing device.

33. The method of claim 32, wherein the first radio comprises PHY and MAC circuitry operable to communicate the communication signal using an ultra wideband (UWB) network.

34. The method of claim 33, wherein the UWB network is capable of communicating signals compliant with the ECMA-368 standard.

35. The method of claim 32, wherein the first radio comprises PHY and MAC circuitry operable to communicate the communication signal using a wireless wide area network (WWAN).

36. The method of claim 32, wherein the first radio comprises PHY and MAC circuitry operable to communicate the communication signal using a wireless local area network (WLAN).

37. The method of claim 32, wherein the communication signal comprises a header comprising information related to the convolutional code constraint length used to encode the communication signal, and dynamically determining the convolutional code constraint length comprises extracting the information from the header and determining the constraint length based at least in part on the extracted information.

38. The method of claim 32, wherein dynamically decoding the communication signal comprises decoding the communication signal with one or more convolutional decoders, the one or more convolutional decoders configured such that a signal encoded with any one of the plurality of convolutional code constraint lengths can be decoded by the one or more convolutional decoders.

39. The method of claim 38, wherein at least one of the one or more convolutional decoders comprises a Viterbi decoder.

40. The method of claim 32, further comprising:
communicating to the transmitting device channel condition information for a channel associated with transmission of the communication signal during the data session with the first radio.

41. The method of claim 32, further comprising:
determining a modulation type used to modulate the communication signal; and
demodulating the communication signal based at least in part on the determined modulation type.

42. A computer program product, comprising:
a computer-readable medium comprising:
code operable to receive from a transmitting device an inquiry whether a communication signal encoded with a convolutional code constraint length selected from a plurality of convolutional code constraint lengths can be dynamically decoded;
code operable to communicate to the transmitting device a response indicative of whether the communication signal can be dynamically decoded;
code operable to dynamically determine a convolutional code constraint length used to encode the communication signal communicated during a data session with a first radio; and
code operable to decode the communication signal based at least in part on the dynamically determined convolutional code constraint length.

43. A wireless communication apparatus comprising:
a receiving device configured to receive a communication signal during a data session with a first radio, the communication signal encoded with a convolutional code constraint length selected from a plurality of convolutional code constraint lengths, the receiving device comprising a circuit configured to:
receive from a transmitting device an inquiry whether the communication signal encoded with the convolutional code constraint length selected from the plurality of convolutional code constraint lengths can be dynamically decoded;
communicate to the transmitting device a response indicative of whether the communication signal can be dynamically decoded;

dynamically determine a convolutional code constraint length used to encode the communication signal communicated during the data session with the first radio; and decode the communication signal based at least in part on the dynamically determined convolutional code constraint length.

44. The wireless communication device of claim 43, wherein the communication signal comprises a header comprising information related to the convolutional code constraint length used to encode the communication signal, and the circuit is further configured to extract the information from the header and determine the constraint length based at least in part on the extracted information.

45. The wireless communication device of claim 43, wherein the receiving device further comprises one or more convolutional decoders for decoding the communication signal based at least in part on the dynamically selected constraint length, the one or more convolutional decoders configured such that a signal encoded with any one of the plurality of convolutional code constraint lengths can be decoded by the one or more convolutional decoders.

46. An apparatus for decoding a communication signal received during a data session with a first radio, the communication signal encoded with a convolutional code constraint length selected from a plurality of convolutional code constraint lengths, the apparatus comprising:

means for receiving from a transmitting device an inquiry whether the communication signal encoded with the convolutional code constraint length selected from the plurality of convolutional code constraint lengths can be dynamically decoded;

means for communicating to the transmitting device a response indicative of whether the communication signal can be dynamically decoded by the decoding means;

means for dynamically determining the convolutional code constraint length used to encode the communication signal communicated during the data session with the first radio; and means for decoding the communication signal based at least in part on the dynamically determined convolutional code constraint length.

47. The apparatus of claim 46, wherein the determining means and the decoding means comprise one or more circuits.

48. The apparatus of claim 46, wherein the first radio comprises PHY and MAC circuitry operable to communicate the communication signal using an ultra wideband (UWB) network.

49. The apparatus of claim 48, wherein the UWB network is capable of communicating signals compliant with the ECMA-368 standard.

50. The method of claim 46, wherein the first radio comprises PHY and MAC circuitry operable to communicate the communication signal using a wireless wide area network (WWAN).

51. The method of claim 46, wherein the first radio comprises PHY and MAC circuitry operable to communicate the communication signal using a wireless local area network (WLAN).

52. A processing apparatus for a wireless network operable to communicate a communication signal during a data session with a first radio, the communication signal encoded with a convolutional code constraint length selected from a plurality of convolutional code constraint lengths, the processing apparatus comprising:

a processor configured to:
receive from a transmitting device an inquiry whether the communication signal encoded with the convolutional code constraint length selected from the plurality of convolutional code constraint lengths can be dynamically decoded;

communicate to the transmitting device a response indicative of whether the communication signal can be dynamically decoded;

dynamically determine the convolutional code constraint length used to encode the communication signal during the data session with the first radio; and decode the communication signal based at least in part on the dynamically determined convolutional code constraint length.

53. The processing apparatus of claim 52, wherein the communication signal comprises a header comprising information related to the convolutional code constraint length used to encode the communication signal, and the processor is configured to extract the information from the header and determine the constraint length based at least in part on the extracted information.

* * * * *